United States Patent
Yang et al.

(10) Patent No.: US 11,729,651 B2
(45) Date of Patent: Aug. 15, 2023

(54) REFERENCE SIGNAL MEASUREMENT REPORTING METHOD, USER EQUIPMENT AND NETWORK DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 146 days.

(21) Appl. No.: 16/961,285

(22) PCT Filed: Jan. 11, 2019

(86) PCT No.: PCT/CN2019/071369
§ 371 (c)(1),
(2) Date: Jul. 10, 2020

(87) PCT Pub. No.: WO2019/137477
PCT Pub. Date: Jul. 18, 2019

(65) Prior Publication Data
US 2021/0076241 A1 Mar. 11, 2021

(30) Foreign Application Priority Data
Jan. 12, 2018 (CN) .......................... 201810032648.5

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0486* (2013.01); *H04B 7/061* (2013.01);
(Continued)

(58) Field of Classification Search
CPC ............. H04W 24/10; H04W 72/0413; H04W 72/042; H04W 72/0446; H04B 7/0486;
(Continued)

(56) References Cited

U.S. PATENT DOCUMENTS

2013/0242902 A1   9/2013   Liu et al.
2014/0079149 A1   3/2014   Lee et al.
(Continued)

FOREIGN PATENT DOCUMENTS

CN   102684835 A   9/2012
CN   103220703 A   7/2013
(Continued)

OTHER PUBLICATIONS

European Search Report dated Feb. 2, 2021 issued in PCT/CN2019/071369.
(Continued)

*Primary Examiner* — Joshua Kading
(74) *Attorney, Agent, or Firm* — Brooks Kushman P.C.

(57) ABSTRACT

A measurement reporting method, a user equipment and a network device are provided. The measurement reporting method includes: measuring a corresponding reference signal according to a downlink measurement configuration of a network device, where the downlink measurement configuration includes at least one of content information of measurement report, measured reference signal resource related information and an association relationship information of reference signal resource and measurement report; generating at least one measurement report, based on at least one of the content information of measurement report, the measured reference signal resource related information, the association relationship information of reference signal
(Continued)

resource and measurement report and measurement results of reference signal; and sending the at least one measurement report.

18 Claims, 8 Drawing Sheets

(51) Int. Cl.
*H04W 72/0446* (2023.01)
*H04B 17/24* (2015.01)
*H04B 17/309* (2015.01)
*H04W 72/21* (2023.01)
*H04B 17/318* (2015.01)
*H04B 7/0456* (2017.01)
*H04L 5/00* (2006.01)
*H04W 72/23* (2023.01)

(52) U.S. Cl.
CPC ......... *H04B 7/0626* (2013.01); *H04B 7/0632* (2013.01); *H04B 7/0639* (2013.01); *H04B 17/24* (2015.01); *H04B 17/309* (2015.01); *H04B 17/318* (2015.01); *H04L 5/0051* (2013.01); *H04W 72/0446* (2013.01); *H04W 72/21* (2023.01); *H04W 72/23* (2023.01)

(58) Field of Classification Search
CPC .. H04B 7/0626; H04B 7/0632; H04B 7/0639; H04B 7/061; H04B 17/24; H04B 17/309; H04B 17/318; H04L 5/0051
See application file for complete search history.

(56) References Cited

U.S. PATENT DOCUMENTS

| | | | |
|---|---|---|---|
| 2015/0124726 A1 | 5/2015 | Ni et al. | |
| 2018/0288645 A1* | 10/2018 | Lee | H04B 17/382 |
| 2018/0338339 A1* | 11/2018 | Song | H04W 76/14 |
| 2019/0058517 A1* | 2/2019 | Kang | H04L 5/0023 |
| 2019/0109626 A1* | 4/2019 | Park | H04B 7/0626 |
| 2019/0165847 A1* | 5/2019 | Kim | H04L 5/0078 |
| 2019/0356439 A1* | 11/2019 | Lee | H04L 5/0048 |
| 2020/0014515 A1* | 1/2020 | Qin | H04L 5/0094 |
| 2020/0099435 A1* | 3/2020 | Kang | H04L 5/0051 |
| 2020/0112355 A1* | 4/2020 | Park | H04B 7/0626 |
| 2020/0212981 A1* | 7/2020 | Guo | H04L 5/0053 |
| 2020/0313827 A1* | 10/2020 | Noh | H04W 72/042 |
| 2020/0322030 A1* | 10/2020 | Yuan | H04B 7/0695 |
| 2022/0103305 A1* | 3/2022 | Xiong | H04L 1/1861 |

FOREIGN PATENT DOCUMENTS

| | | |
|---|---|---|
| CN | 104641573 A | 5/2015 |
| CN | 106559113 A | 4/2017 |
| EP | 3 579 480 A1 | 12/2019 |
| JP | 2015522955 A | 8/2015 |
| WO | 2018187354 A1 | 10/2018 |
| WO | 2019072138 A1 | 4/2019 |

OTHER PUBLICATIONS

3GPP TSG RAN WG1 Meeting #90bis; R1-1717472; Prague, Czech Republic, Oct. 9-13, 2017, 12 pages.
3GPP TSG RAN WG1 Meeting #90bis; RI-1718243; Prague, Czech Republic, Oct. 9-13, 2017, 5 pages.
3GPP TS 38.331, 3rd Generation Partnership Project (3GPP); F-06921, Sophia-Antipolis Cedex, France, vol. RAN WG2, No. V15.0.0, Jan. 4, 2018, 188 pages.
Ericsson, RRC configuration for CSI / MeasConfig [online], 3GPP TSG RANWG2 #100 R2-1713738, Internet, Nov. 27, 2017.
Indian Office Action, dated Oct. 9, 2021, issued in IN202027034581.
Japanese Office Action, dated Sep. 24, 2021, issued in JP2020538598.
Samsung,On Beam Management, Measurement and Reporting[online],3GPPTSG RAN WG1 #91 R1/1720290, Internet, Nov. 27, 2017.
3GPP TSG RAN WG1 NR Ad-Hoc#2, R1-1711291, Qingdao, P.R. China, Jun. 27-30, 2017, "Beam Recovery", 7 pages.
International Preliminary Report on Patentability and Written Opinion dated Jul. 23, 2020 issued in PCT/CN2019/071369.
Huawei, HiSilicon, "Discussion on CSI Framework Design", 3GPP TSG RAN WG1 Meeting #89, May 15-19, 2017, R1-1706926, 9 pages.
Samsung, Beam Management for PDCCH, 3GPP TSG RAN WG1 Meeting NR AHS, Jun. 27-30, 2017, R1-1711604, 6 pages.
CATT, Ericsson, Nokia, ASB, Intel, OPPO, "WF on CSI-RS framework", 3GPP TSG RAN WG1 #89, May 15-19, 2017, R1-1709447, 4 pages.
Japanese Office Action (with English Translation), dated Jun. 1, 2022, Application No. 2020-538598.
Second Office Action for European Application No. 19 738 538.8-1216, dated Dec. 5, 2022, 7 Pages.

\* cited by examiner

REFERENCE SIGNAL MEASUREMENT REPORTING METHOD, USER EQUIPMENT AND NETWORK DEVICE

CROSS REFERENCE OF RELATED APPLICATION

The present application is the U.S. national phase of PCT Application PCT/CN2019/071369 filed on Jan. 11, 2019, which claims a priority of Chinese patent application No. 201810032648.5 filed on Jan. 12, 2018, which is incorporated herein by reference in its entirety.

TECHNICAL FIELD

The present disclosure relates to the field of communications, and more particularly, to a measurement reporting method, a user equipment and a network device.

BACKGROUND

Radio access technology standards in Long Term Evolution (LTE) and LTE-Advanced (LTE-A) are constructed on the basis of Multiple-Input Multiple-Output (MIMO) and Orthogonal Frequency Division Multiplexing (OFDM). Among them, the MIMO technology utilizes the spatial degree of freedom available in the multi-antenna system to improve the peak rate and the spectrum utilization of the system.

As the MIMO technology advances towards three-dimensional and scale-up, the next-generation mobile communication system (5G communication system) will be implemented using the Massive MIMO technology. The Massive MIMO technology uses large-scale antenna arrays, which can greatly improve system frequency band utilization efficiency and support a larger number of access users. If an all-digital array is employed in the Massive MIMO technology, maximized spatial resolution and Multi-User Multiple-Input Multiple-Output (MU-MIMO) performance can be achieved, but this architecture requires a large number of AD/DA conversion devices and a large number of complete RF-baseband processing channels, which will be a significant burden both for equipment costs and baseband processing complexity. Accordingly, a digital-to-analog hybrid beamforming technique has emerged that adds a first order beamforming to the radio frequency signal sent near the front end of the antenna system on the basis of conventional digital domain beamforming. Analog beamforming enables coarser matching of the sent signal to the channel in a simpler manner. The dimension of the equivalent channel formed after analog beamforming is smaller than the actual number of antennas, so that the subsequent required AD/DA conversion devices, the number of digital channels, and the corresponding baseband processing complexity can be greatly reduced.

In the 5G communication system, the analog beamforming is sent in full bandwidth, and each polarization direction array element on the panel of each high frequency antenna array can send the analog beamforming in a time division multiplexed manner only. The beamforming weight of the analog beam is achieved by adjusting the parameters of equipment such as the RF front-end phase shifter. In the related art, training of analog beamforming vectors is generally performed in a polling manner, that is, an array element in each polarization direction on each antenna panel sequentially sends training signals (candidate form vectors) in a time-division multiplexing manner at a predetermined time, and a terminal feeds back a beam reporting to a base station after measurement, so that the base station uses the training signals to implement analog beam transmission when sending a service next time.

The beam reporting is an important basis for a base station to select a training signal. A network side configures setting information (reporting setting) of a beam reporting for a User Equipment (UE) through a higher layer signaling, where the setting information includes content information of the beam reporting, time domain related messages (periodic, aperiodic, and semi-persistent) of the beam reporting, a frequency granularity information of the beam reporting, and the like. The content information in the beam reporting may include at least one optimal transmission beam indication information selected by the UE, a physical layer measurement result (e.g., L1-RSRP) of the beam selected by the UE, grouping information of the beam selected by the UE, and the like.

The beam reporting is one of the measurement reports. In addition, the UE may generate a plurality of measurement reports such as Channel State Information (CSI) reporting. Based on the related art, when a UE generates a measurement report, the content of the measurement report does not have a certain rule, and it is impossible to determine whether to transmit the measurement report, so such process will be blur for the UE when the UE generates the measurement report and transmits the measurement report.

SUMMARY

In a first aspect, a measurement reporting method is provided, applied to a UE, including:

measuring a corresponding reference signal according to a downlink measurement configuration of a network device, where the downlink measurement configuration includes at least one of content information of measurement report, measured reference signal resource related information and an association relationship information of reference signal resource and measurement report;

generating at least one measurement report, based on at least one of the content information of measurement report, the measured reference signal resource related information, the association relationship information of reference signal resource and measurement report and measurement results of reference signal; and sending the at least one measurement report.

In a second aspect, a measurement reporting method is provided, applied to a network device, including:

sending a downlink measurement configuration measuring a corresponding reference signal, where the downlink measurement configuration includes at least content information of measurement report, measured reference signal resource related information and an association relationship information of reference signal resource and measurement report.

In a third aspect, a UE is provided, including:

a measuring module, configured to measure a corresponding reference signal according to a downlink measurement configuration of a network device, where the downlink measurement configuration includes at least one of content information of measurement report, measured reference signal resource related information and an association relationship information of reference signal resource and measurement report;

a generating module, configured to generate at least one measurement report, based on at least one of the content information of measurement report, the measured reference signal resource related information, the association relationship information of reference signal resource and measurement report and measurement results of reference signal, and a measurement result of the reference signal; and a report sending module, configured to send the at least one measurement report.

In a fourth aspect, a network device is provided, including:

a sending module, configured to send a downlink measurement configuration measuring a corresponding reference signal, where the downlink measurement configuration includes at least content information of measurement report, measured reference signal resource related information and an association relationship information of reference signal resource and measurement report.

In a fifth aspect, a UE is provided, including a memory, a processor and a computer program stored in the memory and executable on the processor, where the processor executes the computer program to perform the measurement reporting method in the first aspect.

In a sixth aspect, a computer readable storage medium is provided, where a computer program is stored in the computer readable storage medium, a processor executes the computer program to perform the measurement reporting method in the first aspect.

In a seventh aspect, a network device is provided, including a memory, a processor and a computer program stored in the memory and executable on the processor, where the processor executes the computer program to perform the measurement reporting method in the second aspect.

In an eighth aspect, a computer readable storage medium is provided, where a computer program is stored in the computer readable storage medium, a processor executes the computer program to perform the measurement reporting method in the second aspect.

BRIEF DESCRIPTION OF THE DRAWINGS

The drawings, which are illustrated herein to provide a further understanding of the disclosure and constitute a part of this disclosure, illustrate exemplary embodiments of the disclosure and the description thereof to explain the disclosure, and are not to be construed as unduly limiting the disclosure. In the drawings.

DETAILED DESCRIPTION

The technical solution in the embodiments of the present disclosure will be described more clearly and completely below in connection with the drawings in the embodiments of the present disclosure, and it will be apparent that the described embodiments are a part, but not all, of the embodiments of the present disclosure. Based on the embodiments in the present disclosure, all other embodiments obtained by a person of ordinary skill in the art without creative work are within the scope of the present disclosure. Words "and/or" or "or/and" represent "at least one" of the objects connected by these words.

The technical solution of the present disclosure may be applied to various communication systems, such as Global System of Mobile communication (GSM), Code Division Multiple Access (CDMA) system, Wideband Code Division Multiple Access (WCDMA), General Packet Radio Service (GPRS), Long Term Evolution (LTE)/Long Term Evolution Advanced (LTE-A), and NR (New Radio).

A User Equipment (UE), which may also be referred to as a Mobile Terminal, a mobile user equipment, or the like, may communicate with one or more core networks via a Radio Access Network (RAN). The user equipment may be a mobile terminal, such as a mobile phone (or referred to as a cellular phone), and a computer having a mobile terminal, for example, may be a portable, pocket-sized, handheld, computer-built-in, or in-vehicle mobile device that exchanges language and/or data with the Radio Access Network.

The base station may be a Base Transceiver Station (BTS) in GSM or CDMA, a NodeB (NodeB) in WCDMA, or an evolved NodeB (eNB or e-NodeB (evolutional Node B)) in LTE and a 5G base station (gNB), which is not limited in the present disclosure. However, for ease of description, the following embodiments are described by using gNB as an example.

The technical solutions provided in the embodiments of the present disclosure will be described in detail below with reference to the drawings.

Figure 1:
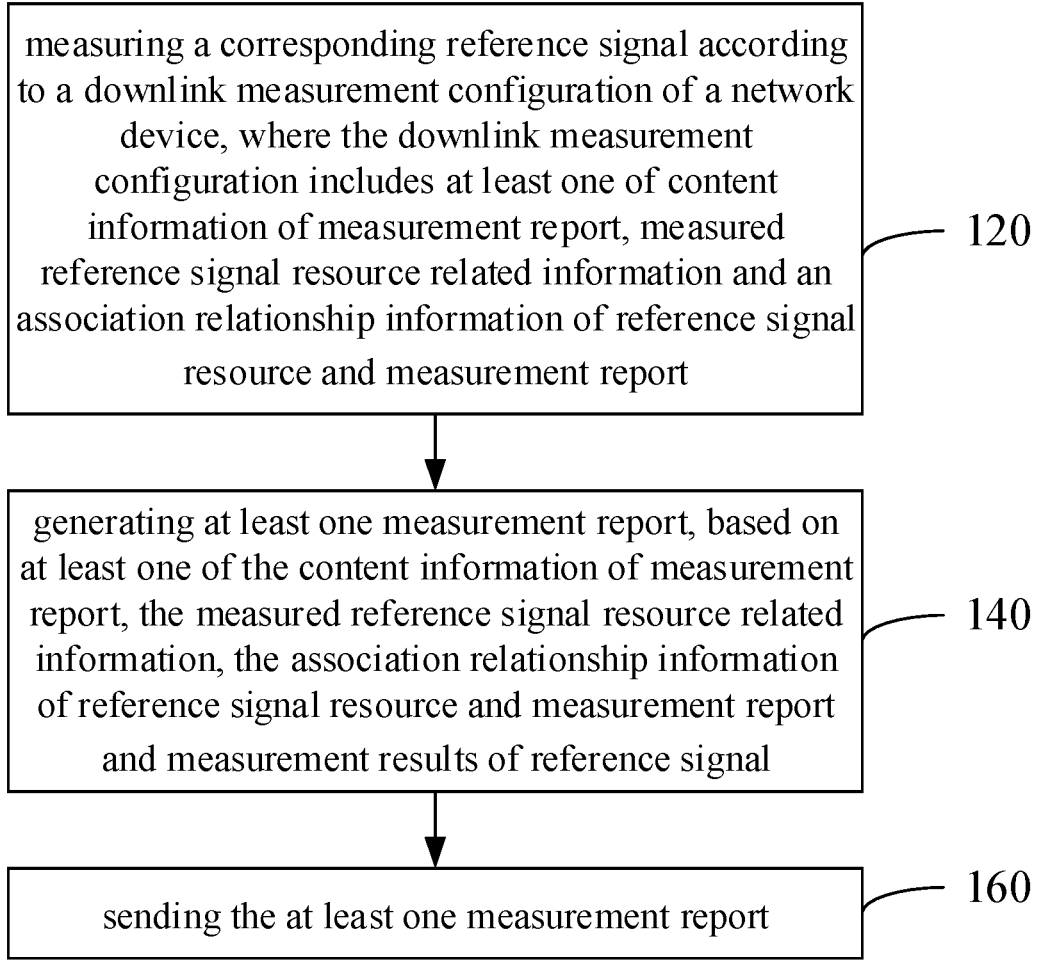
FIG. 1 is a flow chart of a measurement reporting method in an embodiment of the present disclosure.

FIG. 1 is a flow chart of a measurement reporting method in an embodiment of the present disclosure. As shown in FIG. 1, the method includes:

Step 120: measuring a corresponding reference signal according to a downlink measurement configuration of a network device, where the downlink measurement configuration includes at least one of content information of measurement report, measured reference signal resource related information and an association relationship information of reference signal resource and measurement report.

Step 140: generating at least one measurement report, based on at least one of the content information of measurement report, the measured reference signal resource related information, the association relationship information of reference signal resource and measurement report and measurement results of reference signal; and Step 160: sending the at least one measurement report.

According to the embodiment of the present disclosure, the downlink measurement configuration sent by the network device includes at least one of content information of measurement report, measured reference signal resource related information and an association relationship information of reference signal resource and measurement report. After receiving the downlink configuration information, the UE may determine a reference signal to be measured, according to the content information of the measurement report, and measure the reference signal according to the downlink measurement configuration. For the measurement result, the UE may generate at least one measurement report according to at least one of the content information of measurement report, the measured reference signal resource related information and the association relationship information of reference signal resource and measurement report, and then send the measurement report, thereby making clear for the UE the process in generating the measurement report and uploading the measurement report.

In an embodiment of the present embodiment, the content information of the measurement report includes at least a content type of the measurement report, where the content type includes at least one of the following content types:

a beam reporting based on a Channel State Information Reference Signal (CSI-RS) measurement or/and a Synchronization Signal Block (SSB) measurement;

a Channel State Information (CSI) reporting based on a CSI-RS measurement.

In the case that the content type includes a beam reporting based on the CSI-RS measurement, a CSI reference signal (CSI-RS) resource index (CRI) and a Reference Signal Receiving Power (RSRP) of at least one optimal beam may be selected from the measurement results of CSI-RS, to generate a beam reporting.

In the case that the content type includes a beam reporting based on the SSB measurement, a synchronization signal block (SSB) resource index (SSBRI) and a RSRP of at least one optimal beam may be selected from the measurement results of SSB, to generate a beam reporting.

In the case that the content type includes a CSI reporting based on the CSI-RS measurement, at least one of a Channel Quality Indicator (CQI), a Precoding Matrix Indicator (PMI) and a Rank Indication (RI) may be selected from the measurement results of CSI-RS, to generate the CSI reporting.

The beam reporting and CSI reporting are only some of the specific types involved in the embodiments of the present disclosure, and it will be appreciated that the embodiment is not limited to these types.

Optionally, in an embodiment of the present embodiment, the measurement reports may be separately generated by independent reporting. Specifically, Step 140 may specifically include:

in the case that a time domain transmission mode of a RS resource setting or a RS resource set configured in the reference signal resource related information is periodic or semi-persistent, generating, based on the content information of measurement report, a measurement report for the measurement results of reference signal in each RS resource setting or/and RS resource set.

The reference signal resource related information may include a RS resource setting, a RS resource set, a RS resource, and the like, and may also include a reference signal type (RS type) in the RS resource setting and RS resource set, where the RS type may be CSI-RS, SSB, and the like.

The downlink measurement configuration may configure corresponding time domain transmission modes for the RS resource setting and RS resource set. Specifically, the corresponding time domain transmission mode may be set in the content information of the measurement report and reference signal resource related information. When the time domain transmission mode of any one of the RS resource setting or the RS resource set is periodic or semi-persistent, a measurement report for the measurement results of reference signal in each RS resource setting or/and RS resource set may be generated based on the content information of measurement report. For example, a measurement report may be separately generated for the measurement results of reference signal in any one of the RS resource settings; a measurement report or the like may be separately generated for the measurement results of reference signal in any one of the RS resource sets. For respective measurement reports generated for RS resource settings or/and RS resource sets, the UE may send the measurement reports to the network device respectively.

In an embodiment of the present embodiment, the generating, based on the content information of measurement report, the measurement report for the measurement results of reference signal in each RS resource setting or/and RS resource set includes at least one of:

selecting a CRI and a RSRP of at least one optimal beam based on a measurement result of CSI-RS in the RS resource setting or/and the RS resource set, to generate a beam reporting;

selecting a SSBRI and a RSRP of at least one optimal beam based on a measurement result of SSB in the RS resource setting or/and the RS resource set, to generate a beam reporting;

selecting at least one of a CQI, a PMI and a RI based a measurement result of CSI-RS in the RS resource setting or/and the RS resource set, to generate a CSI reporting; or generating a combined measurement result based on a measurement result of CSI-RS and a measurement result of SSB in the RS resource setting or/and the RS resource set, to generate a beam reporting based on the combined measurement result.

In the above four cases, for each RS resource setting or/and RS resource set, a corresponding beam reporting may be generated separately or a corresponding CSI reporting may be generated separately. It should be noted that when one RS resource setting or/and RS resource set has both CSI-RS and SSB types of reference signals, a combined measurement result may be generated based on the measurement results of CSI-RS and SSB, and the beam reporting may be generated based on the combined measurement result.

Optionally, in an embodiment of the present embodiment, in some cases, only after the network device sends a trigger signal to the UE, the UE will measure the corresponding reference signal, so as to prevent the UE from measuring unwanted data. To this end, Step 120 may specifically include:

in the case that time domain transmission modes of a RS resource setting and a RS resource set configured in the reference signal resource related information are both aperiodic and first DCI triggering a measurement of the RS resource setting or/and the RS resource set configured in the reference signal resource related information is received from the network device, measuring the corresponding reference signal in the RS resource setting or/and the RS resource set.

In the present embodiment, when the time domain transmission modes of the RS resource setting and the RS resource set are both aperiodic, if the network device sends the first DCI to the UE, the UE may measure a corresponding reference signal in the RS resource setting or/and the RS resource set. For example, at least one signal of CSI-RS, SSB in RS resource setting or/and RS resource set may be measured.

To facilitate reporting of the measurement results, optionally, in an embodiment of the present embodiment, after the corresponding reference signals in the RS resource setting or/and RS resource set are measured, the UE may further perform the corresponding combined calculations.

When performing the combined calculations, the combined calculations may include the following two manners.

In a first combined calculation manner, one of the RS types of the two RS resource setting or RS resource set is CSI-RS and the other is SSB. Specifically, when a RS type in a first RS resource setting or RS resource set is CSI-RS and the a RS type in a second RS resource setting or RS resource set is SSB, a combined measurement result generated after performing a corresponding CSI-RS measurement on the first RS resource setting or RS resource set and SSB measurement on the second RS resource setting or RS resource set may be determined.

In a second combined calculation manner, the RS types in one RS resource setting or RS resource set include both CSI-RS and SSB. Specifically, in the case that a corresponding RS type in a third RS resource setting or RS resource set includes a CSI-RS and an SSB, a combined measurement result generated after performing a corresponding CSI-RS measurement and SSB measurement on the third RS resource setting or RS resource set may be determined.

Optionally, in another embodiment of the present embodiment, after the corresponding reference signal in RS resource setting or/and RS resource set is measured, in the case that a content type of measurement report configured in the content information of measurement report is a beam reporting and a reporting content in the configured beam reporting includes a SSBRI and a corresponding RSRP, a combined calculation is performed on SSB and CSI-RS measurement results in the RS resource setting or the RS resource set.

The corresponding SSB and CSI-RS used in performing the combined calculation may be in a spatial Quasi Co-Location (QCL) relationship. When the combined calculation is performed on the measurement results of the SSB and the CSI-RS in the RS resource setting or the RS resource set, the calculated RSRP may be determined based on the RSRP in the CSI-RS measurement result and the RSRP in the SSB measurement result; thereafter, the corresponding SSBRI may be determined based on the determined RSRP.

The UE may implement two combined calculation manners at the same time, or may implement only one combined calculation manner. Specifically, the UE may select the manner based on the specific manners of the two combined calculation manners. It should be noted that the UE may perform a combined calculation on other reference signals of RS types, and the above combined calculation manner of the embodiments is not specifically limited.

For a specific method of combined calculation, optionally, in the present embodiment, the determining the combined measurement result generated after performing the corresponding CSI-RS measurement and SSB measurement includes:

determining a maximum value or a statistical average value of RSRPs after the CSI-RS measurement and the SSB measurement are performed;

determining a RS resource index corresponding to the maximum value or the statistical average, where the RS resource index includes a CRI and/or an SSBRI; and taking the determined RS resource index and the RSRP corresponding to the determined RS resource index as the combined measurement result.

After the CSI-RS measurement is performed, a plurality of CRIs and corresponding RSRPs are formed. After the SSB measurement is performed, a plurality of SSBRIs and corresponding RSRPs are formed. The maximum value or the statistical average value of the RSRPs may be calculated, and the RS resource index may be determined based on the maximum value or the statistical average value, and the determined RS resource index and the corresponding RSRP may be used as a combined measurement result in this embodiment. Where the calculation of the maximum value or the statistical average value of RSRP is optical, and other different combined calculation methods may be adopted based on the specific application or needs or actual situation, and detailed description thereof is omitted herein.

It should be noted that the first, second and third RS resource setting or RS resource set in the present embodiment are merely intended to better distinguish the RS types in the RS resource setting or RS resource set and do not represent a specific order. Specifically, the UE may measure one or more RS resource settings or RS resource sets, and the combined calculation may be performed as long as the RS resource setting or RS resource set satisfies either of the above two combined calculation manners.

Optionally, in an embodiment of the present embodiment, the first, second and/or third RS resource setting or RS resource set for generating the combined measurement result are determined in one of the following manners:

determined based on configuration information received from the network device;

selected and determined by the UE according to a preset manner; or determined according to pre-determined information with the network device.

Specifically, the RS resource setting or the RS resource set involved in the combined calculation may be selected by the UE, that is, selected by the UE according to a preset manner; or may be determined according to the configuration information issued by the network device, and a specific RS resource setting or RS resource set involved in the combined calculation may be determined based on the configuration information; or may be determined by the network device and the UE by means of pre-determined information.

Optionally, in another embodiment of the present embodiment, after the UE obtains the measurement result according to the first DCI, there is a case in which the network device does not need to send the measurement report. In this case, if the UE has already generated the measurement report, that is a waste of operation capability. Therefore, in this embodiment, only when the UE receives the second DCI, the UE may generate a measurement report and report the measurement report, that is, send the measurement report to the network device. In this embodiment, the second DCI may also trigger the UE to rank the measurement results and the report the ranked measurement results. Specifically, Step 140 may specifically include:

in the case that a second DCI triggering at least one report setting is received from the network device, determining an ranking manner of the measurement results according to at least one of the content information of measurement report, the measured reference signal resource related information and the association relationship information of reference signal resource and measurement report;

ranking the measurement results according to the ranking manner; and generating the measurement report according to the ranked measurement results.

To facilitate reporting of the measurement report, the measurement results may be ranked in this embodiment. A specific ranking manner may be determined according to at least one of the content information of measurement report, the measured reference signal resource related information and the association relationship information of reference signal resource and measurement report.

Optionally, in an embodiment of the present embodiment, the ranking manner may be a ranking manner of one or more RS resource settings or/and RS resource sets associated with the report setting in the association relationship information of reference signal resource and measurement report.

Optionally, in an embodiment of the present embodiment, the determining the ranking manner of the measurement results may include:

determining the ranking manner according to ranking information received from the network device; or determining the ranking manner according to ranking information pre-determined with the network device; or determining the ranking manner according to pre-stored ranking information.

The UE may receive the ranking information from the network device to determine the ranking manner, or may determine the ranking manner through the ranking information pre-determined with the network device, or may determine the ranking manner according to the pre-stored ranking information. The ordering information may be varied, which may be specific rules, or specific order definitions, etc.

Optionally, in an embodiment of the present embodiment, the network device may trigger the UE to send a measurement report while triggering the UE to perform a measurement. In this case, the second DCI is the same as the first DCI, so that the network device may trigger the UE to perform the measurement and send the measurement report through the same DCI. In some other cases, the first DCI and the second DCI may be different, so that the UE perform a measurement after receiving the first DCI, but does not report the measurement report, and the UE may generate a measurement report and report the measurement report only after receiving the second DCI. The case of triggering both the measurement and the reporting may be applied to more important situations or situations in which a program needs to be responded more timely. The case in which the measurement is triggered first and then the reporting is triggered may be applied to some similar different cases.

Optionally, in an embodiment of the present embodiment, the ranking manner includes: ranking according to at least one of a report setting index, a RS resource setting index, a content type of measurement report determined by the content information of measurement report, a RS resource set index, a RS type in the RS resource setting and a RS type in the RS resource set.

It should be noted that the content on which the ranking manner is based may be used as ranking information, and the ranking information may be received from or pre-determined with the network device or pre-stored to determine the corresponding ranking manner.

Optionally, in an embodiment of the present embodiment, the ranking may be performed according to report setting index, or may be performed according to the content type (e.g., beam reporting, CSI reporting) of the reporting content information.

The measurement results of the RS resource setting or/and RS resource set corresponding to each report setting may be ranked according to RS resource setting index of RS resource setting, or may be ranked according to RS resource set index of RS resource set, or may be ranked according to RS type in RS resource setting or RS resource set, or the like.

For example, where RS resource set1 is used for a beam measurement and includes a CSI-RS resource, RS resource set2 is used for a CSI measurement and includes a CSI-RS resource, resource set3 is used for a beam measurement and includes an SSB. If the ranking is performed according to the content type of the reporting content information, assuming that the ranking is performed according to the sequence of the beam reporting and the CSI reporting, the beam measurement result CRI of RS resource set1 and the corresponding RSRP may be first arranged in the ranking, then the beam measurement result SSBRI of resource set3 and the corresponding RSRP may be followed, and finally the CSI measurement result CQI, PMI and RI may be followed. Of course, such ranking manner may also be determined by the RS type.

In the present embodiment, the ranking may be performed based on a corresponding order. In particular, in one embodiment of the present embodiment, the ranking manner may be ranking one or more RS resource settings or/and RS resource sets based on the report setting. For example, the report setting may be firstly ranked based on the ranking rules of the report setting, and then the ranking rules of the RS resource setting or/and the RS resource set within each report setting may be further ranked, and then the measurement result in each RS resource setting or/and the RS resource set may be further ranked.

In the present embodiment, the ranking may also be performed in a cross-ranking manner, where each report setting triggered by the second DCI corresponds to one or more RS resource settings or RS resource sets. The report setting correspondingly has a report setting index and a Report Quantity, where the Report Quantity may be at least one of CRI and corresponding RSRP, SSBRI and corresponding RSRP, CSI measurement CQI, PMI and RI, etc. RS resource setting or RS resource set correspondingly has a RS resource setting index or a RS resource set index and RS types including CSI-RS and SSB, etc. When performing the ranking, at least one report setting may be ranked firstly, then the ranking relationship of the respective report settings may be determined, for example, the ranking may be performed according to the sequence numbers of the respective report settings, which may be report setting1, report setting2, or the like. Thereafter, the RS resource settings or RS resource sets may be further ranked according to the sequence numbers of respective RS resource settings or RS resource sets in the report setting, for example, RS resource set1 in report setting1, RS resource set1 in report setting1, RS resource set2 in report setting1, RS resource set2 in report setting2, and the like. Thereafter, the measurements in respective RS resource settings or/and RS resource sets may be further ranked, i.e., the ranking may further be performed based on the RS types in the RS resource setting or RS resource set. The case of cross-ranking is as described in the previous paragraph, for example, the RS resource settings or RS resource set may be gathered firstly, and then the RS resource settings or RS resource sets are ranked based on the RS types, etc. A person skilled in the art may derive a manner of cross-ordering based on other parameters based on the above description, and details thereof are not described herein.

Optionally, in another implementation manner of the present embodiment, after the UE obtains the measurement result according to the first DCI, if the UE receives the third DCI, the UE may generate a measurement report and report the measurement report, that is, send the measurement report to the network device. In this embodiment, the third DCI may trigger the UE to report the measurement result separately. Specifically, Step 140 may specifically include:

in the case that a third DCI triggering at least one report setting is received from the network device, generating, based on the content information of measurement report, a measurement report for the measurement results of reference signal in each RS resource setting or/and RS resource set.

The process of generating the measurement reports by the UE through the third DCI is the same as the process of generating the measurement reports for the measurement results of reference signal in each RS resource setting or/and RS resource set according to the content information of the measurement reports when the time domain transmission modes of the RS resource settings or the RS resource sets configured in the reference signal resource related information is periodic or semi-persistent. Specifically, the detailed process of generating the measurement reports may be combined with the above specific contents of the present embodiment.

Optionally, in this embodiment, the third DCI and the first DCI may be the same or different. Specifically, when the network device requires the UE to directly generate the measurement report and report the same after the UE obtains the measurement result, the third DCI and the first DCI may be the same. The third DCI may have some delay relative to the first DCI when the network device needs to delay the receiving of the measurement report after triggering through the first DCI the UE to perform the measurement. Of course, the network device may not send the third DCI to the UE when the measurement report is not required by the network device. In this case, the UE may not generate the measurement report according to the measurement result, and may not report the measurement report.

In this embodiment, the first DCI, the second DCI and the third DCI may be carried by a Physical Downlink Control Channel (PDCCH) sent by the network device and sent to the UE.

Figure 2:
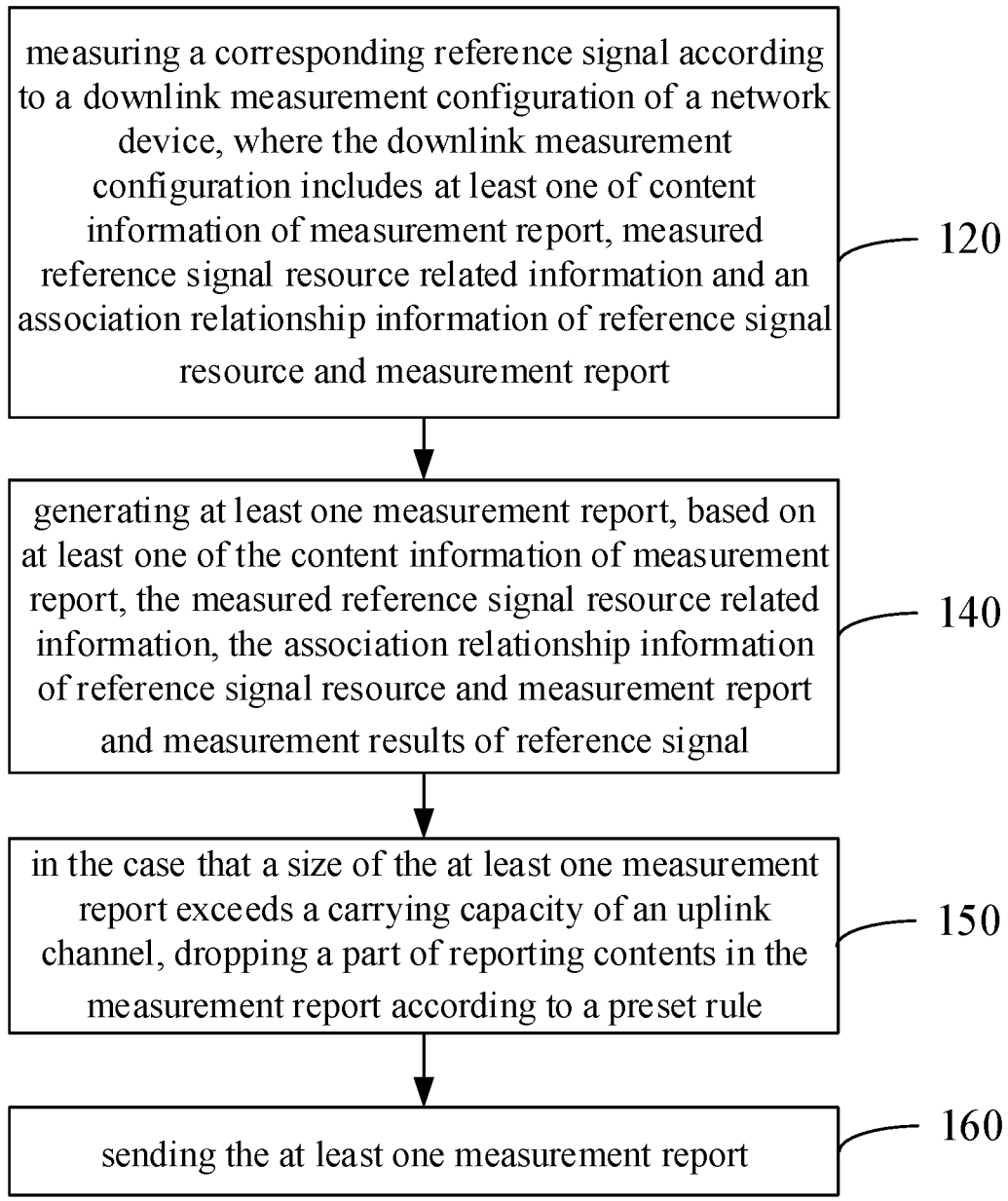
FIG. 2 is a flow chart of a method of measurement reporting in another embodiment of the present disclosure.

After the UE generates the measurement report and before the UE sends the measurement report, it may be determined whether a size of the measurement report exceeds a carrying capacity of the uplink channel. The size of the measurement report may be the number of bits in the measurement report. The carrying capacity of the uplink channel needs to be larger than the size of the measurement report, otherwise, the uploading of the measurement report will be affected. To this end, as shown in FIG. 2, before step 160, the method further includes:

Step 150: in the case that a size of the at least one measurement report exceeds a carrying capacity of an uplink channel, dropping a part of reporting contents in the measurement report according to a preset rule.

Prior to the dropping a part of reporting contents in the measurement report according to the preset rule, the method further includes:

determining the preset rule according to rule information received from the network device; or determining the preset rule according to rule information pre-determined with the network device; or determining the preset rule according to pre-stored rule information.

The present embodiment provides three ways of determining preset rules to dropping a part of measurement report. Of course, the present embodiment may include other ways or methods as long as the measurement report has a size can be carried by the uplink channel.

In this embodiment, a part of reporting contents in the measurement report may be dropped according to the priority or the ranking order of the reporting contents in the measurement report. As can be seen from the above, the reporting contents of the measurement report may be the reporting contents formed by ranking the measurement results. Therefore, the reporting contents may have a certain ranking order, and the to-be-dropped reporting contents may be selected according to the corresponding order. For example, the part of reporting contents arranged at the end may be dropped. Different reporting contents may have corresponding priorities, that is, although the reporting contents are ranked, the corresponding priorities thereof may be different. In this embodiment, it is also able to drop a part of the reporting contents according to the priorities. For example, a reporting content with a lower priority may be preferentially dropped, and thereafter, the reporting content at the position following the dropped reporting content is moved to the position where the dropped reporting content is located, and such movement needs to ensure the continuity of the reporting contents, so as to reduce the bit size occupied by the measurement report.

Figure 3:
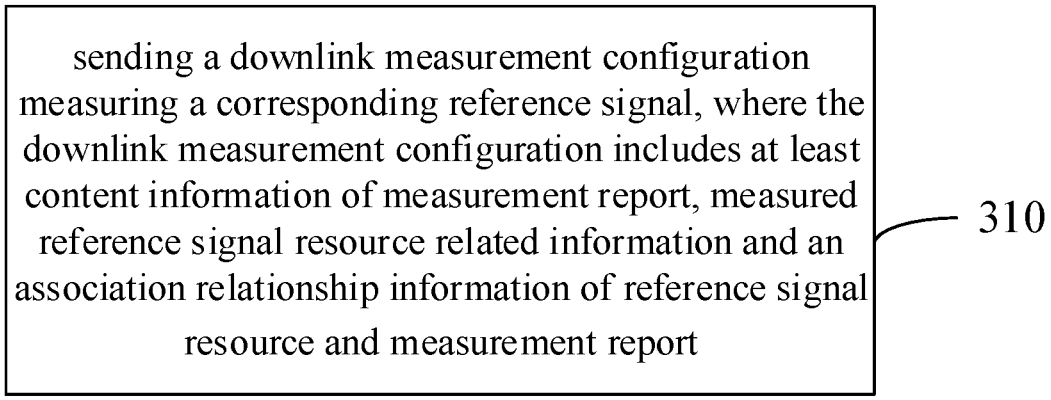
FIG. 3 is a flow chart of a measurement reporting method in another embodiment of the present disclosure.

FIG. 3 is a flow chart of a measurement reporting method in another embodiment of the present disclosure. As shown in FIG. 3, the method includes:

Step 310: sending a downlink measurement configuration measuring a corresponding reference signal, where the downlink measurement configuration includes at least content information of measurement report, measured reference signal resource related information and an association relationship information of reference signal resource and measurement report.

In an embodiment of the present embodiment, the content information of measurement report includes at least a content type of measurement report; the content type includes at least one of:

a beam reporting based on a CSI-RS measurement or/and a SSB measurement; and a CSI reporting based on a CSI-RS measurement.

The reference signal resource related information may include a RS resource setting, a RS resource set, a RS resource, and the like, and may also include RS type in the RS resource setting and RS resource set, where the RS type may be CSI-RS, SSB, and the like.

The downlink measurement configuration may configure corresponding time domain transmission modes for the RS resource setting and the RS resource set.

At least one of the content information of measurement report, the measured reference signal resource related information and the association relationship information of reference signal resource and measurement report may be used to rank the measurement results.

In conjunction with the above description, after the network device sends the downlink measurement configuration and the UE receives the downlink measurement configuration, the UE may determine which reference signals are to be measured, according to the content information of the measurement report. The UE may further determine whether to generate a measurement report and whether to upload the measurement report.

According to the embodiment of the present disclosure, the downlink measurement configuration sent by the network device includes at least one of content information of measurement report, measured reference signal resource related information and an association relationship information of reference signal resource and measurement report. After receiving the downlink configuration information, the UE may determine a reference signal to be measured, according to the content information of the measurement report, and measure the reference signal according to the downlink measurement configuration. For the measurement result, the UE may generate at least one measurement report according to at least one of the content information of measurement report, the measured reference signal resource related information and the association relationship information of reference signal resource and measurement report, and then send the measurement report, thereby making clear for the UE the process in generating the measurement report and uploading the measurement report.

Figure 4:
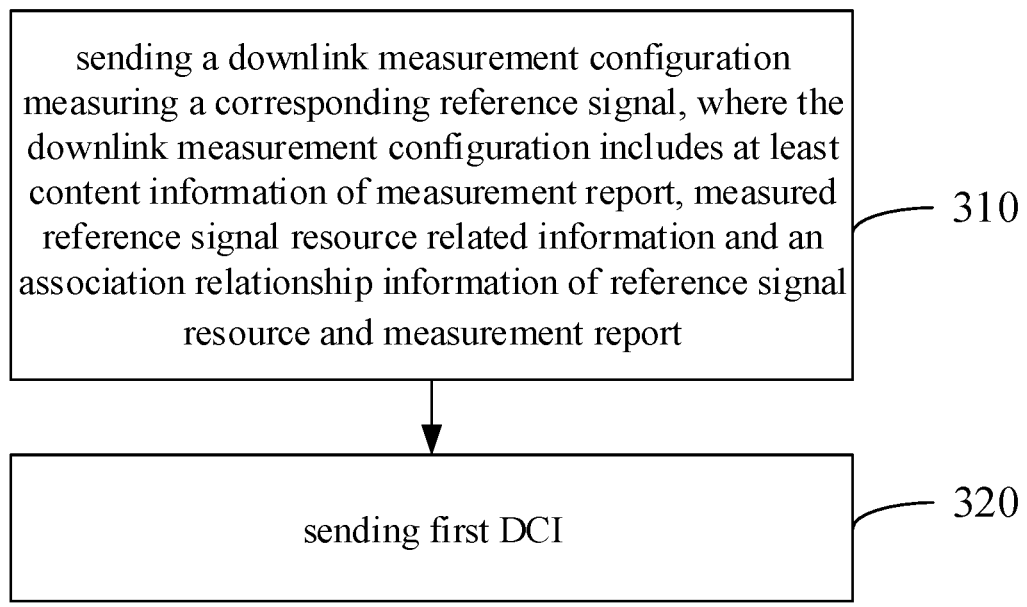
FIG. 4 is a flow chart of a measurement reporting method in another embodiment of the present disclosure.

FIG. 4 is a flow chart of a measurement reporting method in another embodiment of the present disclosure. As shown in FIG. 4, the method further comprises:

Step 320: sending first DCI triggering a UE to measure the corresponding reference signal in a RS resource setting or/and a RS resource set configured in the reference signal resource related information in the case that time domain transmission modes of the RS resource setting and the RS resource set configured in the reference signal resource related information are both aperiodic.

Figure 5:
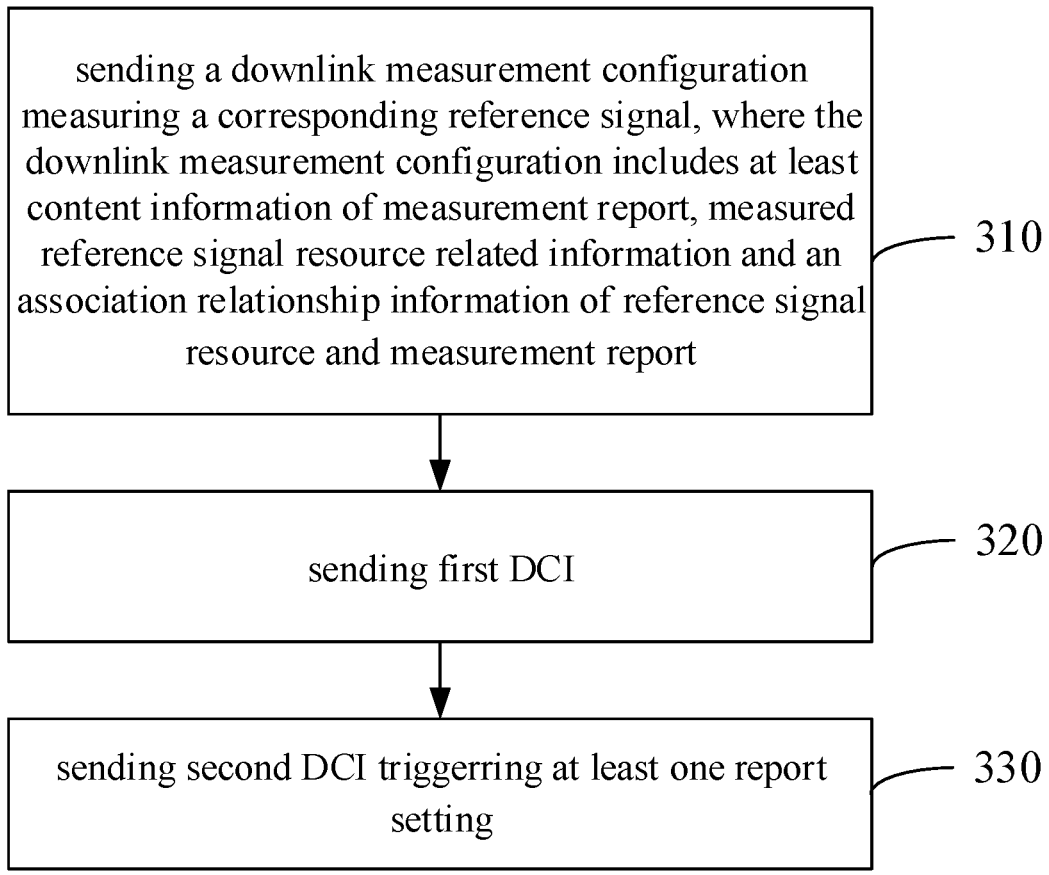
FIG. 5 is a flow chart of a measurement reporting method in another embodiment of the present disclosure.

FIG. 5 is a flow chart of a measurement reporting method in another embodiment of the present disclosure. As shown in FIG. 5, the method further comprises:

Step 330: sending second DCI triggering at least one report setting, where the second DCI is for enabling the UE to determine an ranking manner of measurement results according to at least one of the content information of measurement report, the measured reference signal resource related information and the association relationship information of reference signal resource and measurement report and report the measurement report.

In this embodiment, the network device may also send ranking information enabling the UE to determine the ranking manner. The network device may send the ranking information before sending the second DCI, so as to prevent the UE from affecting the ranking manner when receiving the second DCI. The above description in the present embodiment may be combined with a specific ranking manner.

Figure 6:
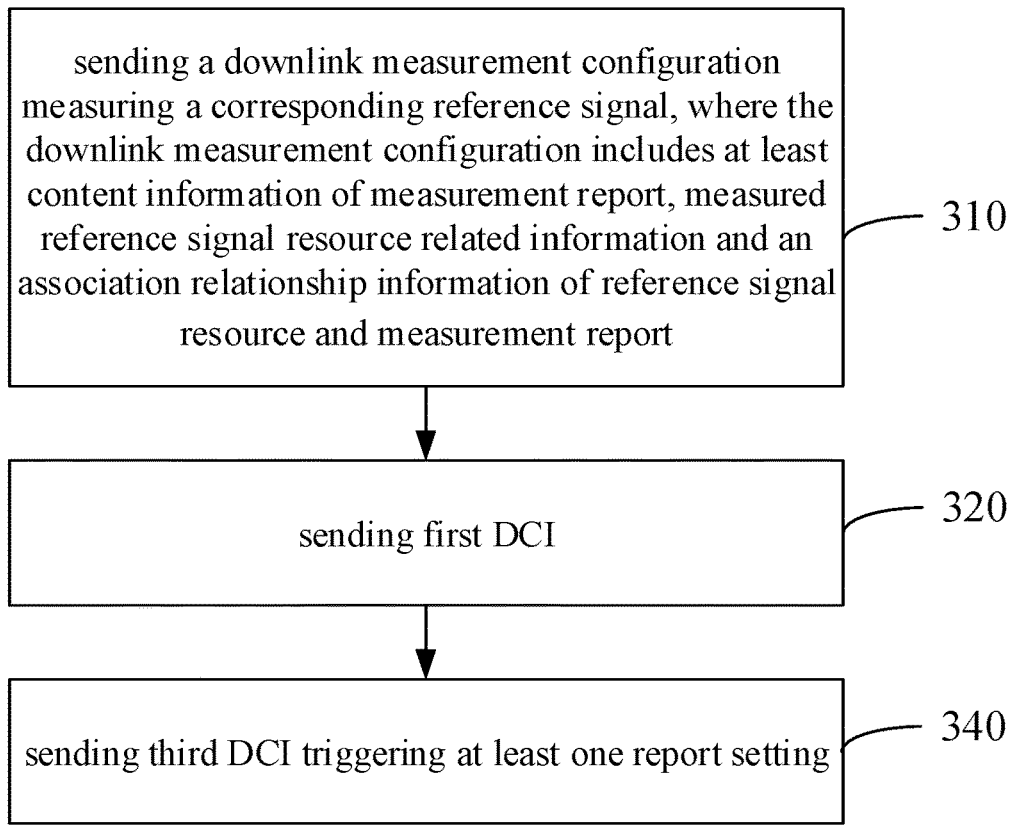
FIG. 6 is a flow chart of a measurement reporting method in another embodiment of the present disclosure.

FIG. 6 is a flow chart of a measurement reporting method in another embodiment of the present disclosure. As shown in FIG. 6, the method further comprises:

Step 340: sending third DCI triggering at least one report setting, where the third DCI is for enabling the UE to generate, based on the content information of measurement report, a measurement report for the measurement results of reference signal in each RS resource setting or/and RS resource set and send the measurement report.

In this embodiment, the network device may further send rule information enabling the UE to drop a part of reporting contents in the measurement report in the case that a size of the generated at least one measurement report exceeds a carrying capacity of an uplink channel.

It should be noted that the details of the method of FIGS. 3 to 6 may be combined with the details of FIGS. 1 to 2.

Figure 7:
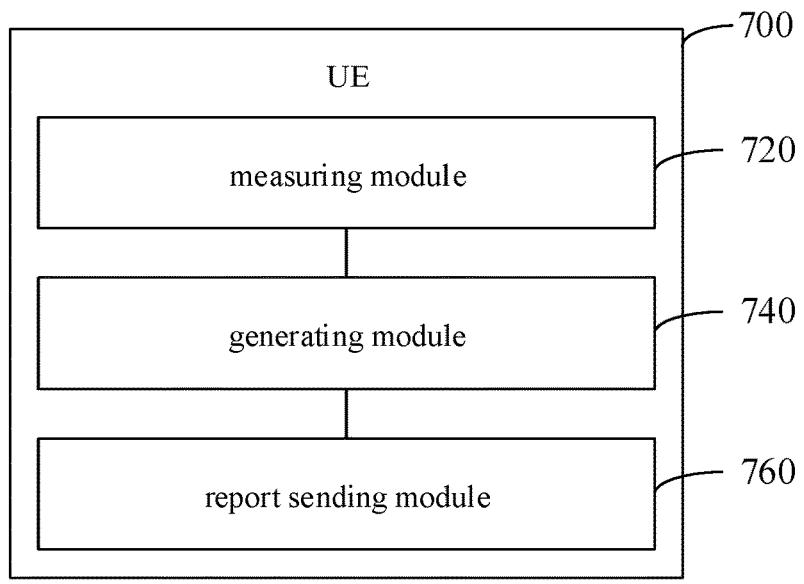
FIG. 7 is a structural diagram of a UE in an embodiment of the present disclosure.

FIG. 7 is a block diagram of a UE in an embodiment of the present disclosure. As shown in FIG. 7, the UE 700 includes:

a measuring module 720, configured to measure a corresponding reference signal according to a downlink measurement configuration of a network device, where the downlink measurement configuration includes at least one of content information of measurement report, measured reference signal resource related information and an association relationship information of reference signal resource and measurement report;

a generating module 740, configured to generate at least one measurement report, based on at least one of the content information of measurement report, the measured reference signal resource related information, the association relationship information of reference signal resource and measurement report and measurement results of reference signal, and a measurement result of the reference signal; and a report sending module 760, configured to send the at least one measurement report.

According to the embodiment of the present disclosure, the downlink measurement configuration sent by the network device includes at least one of content information of measurement report, measured reference signal resource related information and an association relationship information of reference signal resource and measurement report. After receiving the downlink configuration information, the UE may determine a reference signal to be measured, according to the content information of the measurement report, and measure the reference signal according to the downlink measurement configuration. For the measurement result, the UE may generate at least one measurement report according to at least one of the content information of measurement report, the measured reference signal resource related information and the association relationship information of reference signal resource and measurement report, and then send the measurement report, thereby making clear for the UE the process in generating the measurement report and uploading the measurement report.

Optionally, the content information of measurement report includes at least a content type of measurement report; the content type includes at least one of:

a beam reporting based on a CSI-RS measurement or/and a SSB measurement; and a CSI reporting based on a CSI-RS measurement.

Optionally, the generating module 740 is further configured to:

in the case that a time domain transmission mode of a RS resource setting or a RS resource set configured in the reference signal resource related information is periodic or semi-persistent, generate, based on the content information of measurement report, a measurement report for the measurement results of reference signal in each RS resource setting or/and RS resource set.

Optionally, the generating module 740 is further configured to:

select a CRI and a RSRP of at least one optimal beam based on a measurement result of CSI-RS in the RS resource setting or/and the RS resource set, to generate a beam reporting;

select a SSBRI and a RSRP of at least one optimal beam based on a measurement result of SSB in the RS resource setting or/and the RS resource set, to generate a beam reporting;

select at least one of a CQI, a PMI and a RI based a measurement result of CSI-RS in the RS resource setting or/and the RS resource set, to generate a CSI reporting; or generate a combined measurement result based on a measurement result of CSI-RS and a measurement result of SSB in the RS resource setting or/and the RS resource set, to generate a beam reporting based on the combined measurement result.

Optionally, the measuring module 720 is further configured to:

in the case that time domain transmission modes of a RS resource setting and a RS resource set configured in the reference signal resource related information are both aperiodic and first DCI triggering a measurement of the RS resource setting or/and the RS resource set configured in the reference signal resource related information is received from the network device, measure the corresponding reference signal in the RS resource setting or/and the RS resource set.

Figure 8:
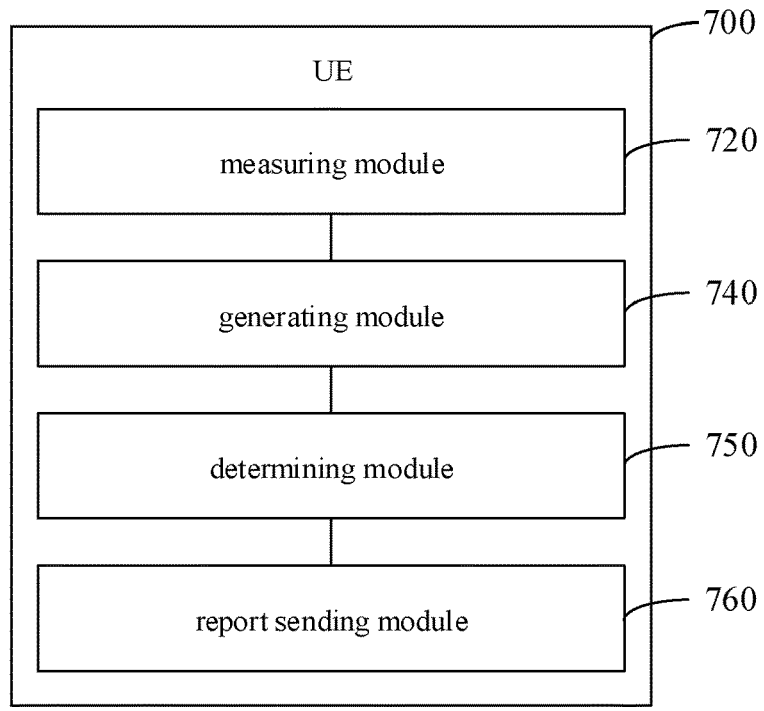
FIG. 8 is a structural diagram of a UE in another embodiment of the present disclosure.

FIG. 8 is a structural diagram of a UE in another embodiment of the present disclosure. As shown in FIG. 8, the UE 700 further includes:

a determining module 750, configured to, in the case that a corresponding RS type in a first RS resource setting or RS resource set is a CSI-RS and a corresponding RS type in a second RS resource setting or RS resource set is an SSB, determine a combined measurement result generated after performing a corresponding CSI-RS measurement on the first RS resource setting or RS resource set and SSB measurement on the second RS resource setting or RS resource set; or in the case that a corresponding RS type in a third RS resource setting or RS resource set includes a CSI-RS and an SSB, determine a combined measurement result generated after performing a corresponding CSI-RS measurement and SSB measurement on the third RS resource setting or RS resource set.

Optionally, the measuring module 720 is further configured to:

in the case that a content type of measurement report configured in the content information of measurement report is a beam reporting, and a reporting content in the configured beam reporting includes a SSBRI and a corresponding RSRP, perform a combined calculation on SSB and CSI-RS measurement results in the RS resource setting or the RS resource set.

Optionally, the determining module 750 is further configured to:

determine a maximum value or a statistical average value of RSRPs after the CSI-RS measurement and the SSB measurement are performed;

determine a RS resource index corresponding to the maximum value or the statistical average, where the RS resource index includes a CRI and/or an SSBRI; and take the determined RS resource index and the RSRP corresponding to the determined RS resource index as the combined measurement result.

Optionally, the determining module 750 is further configured to: determine the first, second and/or third RS resource setting or RS resource set for generating the combined measurement result in one of the following manners:

based on configuration information received from the network device;

by the UE according to a preset manner; or according to pre-determined information with the network device.

Optionally, the generating module 740 is further configured to:

in the case that a second DCI triggering at least one report setting is received from the network device, determine an ranking manner of the measurement results according to at least one of the content information of measurement report, the measured reference signal resource related information and the association relationship information of reference signal resource and measurement report;

rank the measurement results according to the ranking manner; and generate the measurement report according to the ranked measurement results.

Optionally, the ranking manner includes:

a ranking manner of one or more RS resource settings or/and RS resource sets associated with the report setting in the association relationship information of reference signal resource and measurement report.

Optionally, the generating module 740 is further configured to:

determine the ranking manner according to ranking information received from the network device; or determine the ranking manner according to ranking information pre-determined with the network device; or determine the ranking manner according to pre-stored ranking information.

Optionally, the second DCI is the same as the first DCI.

Optionally, the ranking manner includes: ranking according to at least one of a report setting index, a RS resource setting index, a content type of measurement report determined by the content information of measurement report, a RS resource set index, a RS type in the RS resource setting and a RS type in the RS resource set.

Optionally, the generating module 740 is further configured to:

in the case that a third DCI triggering at least one report setting is received from the network device, generate, based on the content information of measurement report, a measurement report for the measurement results of reference signal in each RS resource setting or/and RS resource set.

Optionally, the third DCI is the same as the first DCI.

Figure 9:
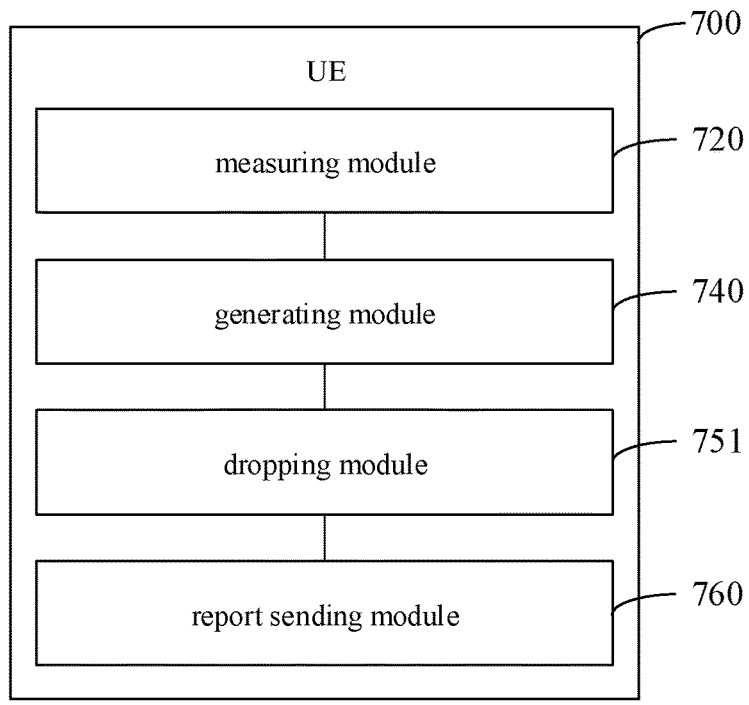
FIG. 9 is a structural diagram of a UE in another embodiment of the present disclosure.

FIG. 9 is a structural diagram of a UE in another embodiment of the present disclosure. As shown in FIG. 9, the UE 700 further includes:

a dropping module 751, configured to, in the case that a size of the at least one measurement report exceeds a carrying capacity of an uplink channel, dropping a part of reporting contents in the measurement report according to a preset rule.

Optionally, the dropping module 751 is further configured to:

determine the preset rule according to rule information received from the network device; or determine the preset rule according to rule information pre-determined with the network device; or determine the preset rule according to pre-stored rule information.

Optionally, the dropping module 751 is further configured to:

drop a part of reporting contents in the measurement report according to priorities or an arrangement order of reporting contents.

Figure 10:
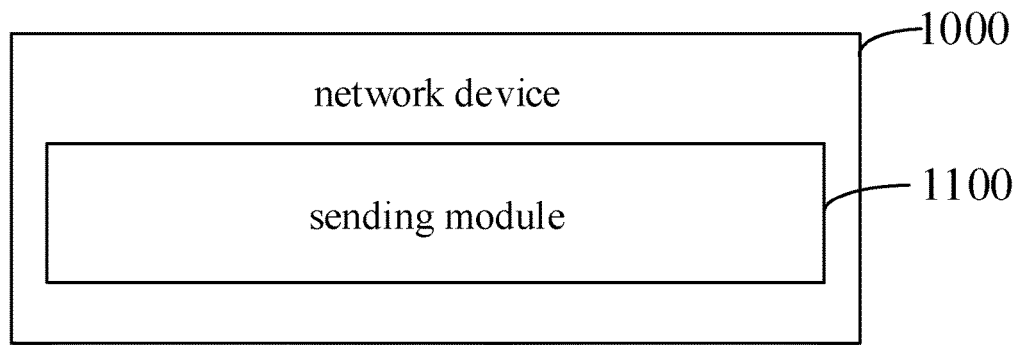
FIG. 10 is a block diagram of a network device in an embodiment of the present disclosure.

FIG. 10 is a block diagram of a network device in an embodiment of the present disclosure. As shown in FIG. 10, a network device 1000 includes:

a sending module 1100, configured to send a downlink measurement configuration measuring a corresponding reference signal, where the downlink measurement configuration includes at least content information of measurement report, measured reference signal resource related information and an association relationship information of reference signal resource and measurement report.

Optionally, the sending module 1100 is further configured to:

send first DCI triggering a UE to measure the corresponding reference signal in a RS resource setting or/and a RS resource set configured in the reference signal resource related information in the case that time domain transmission modes of the RS resource setting and the RS resource set configured in the reference signal resource related information are both aperiodic.

Optionally, the sending module 1100 is further configured to:

send second DCI triggering at least one report setting, where the second DCI is for enabling the UE to determine an ranking manner of measurement results according to at least one of the content information of measurement report, the measured reference signal resource related information and the association relationship information of reference signal resource and measurement report.

Optionally, the sending module 1100 is further configured to:

send ranking information enabling the UE to determine the ranking manner.

Optionally, the sending module 1100 is further configured to:

send third DCI triggering at least one report setting, where the third DCI is for enabling the UE to generate, based on the content information of measurement report, a measurement report for the measurement results of reference signal in each RS resource setting or/and RS resource set.

Optionally, the sending module 1100 is further configured to:

send rule information enabling the UE to drop a part of reporting contents in the measurement report in the case that a size of the generated at least one measurement report exceeds a carrying capacity of an uplink channel.

Figure 11:
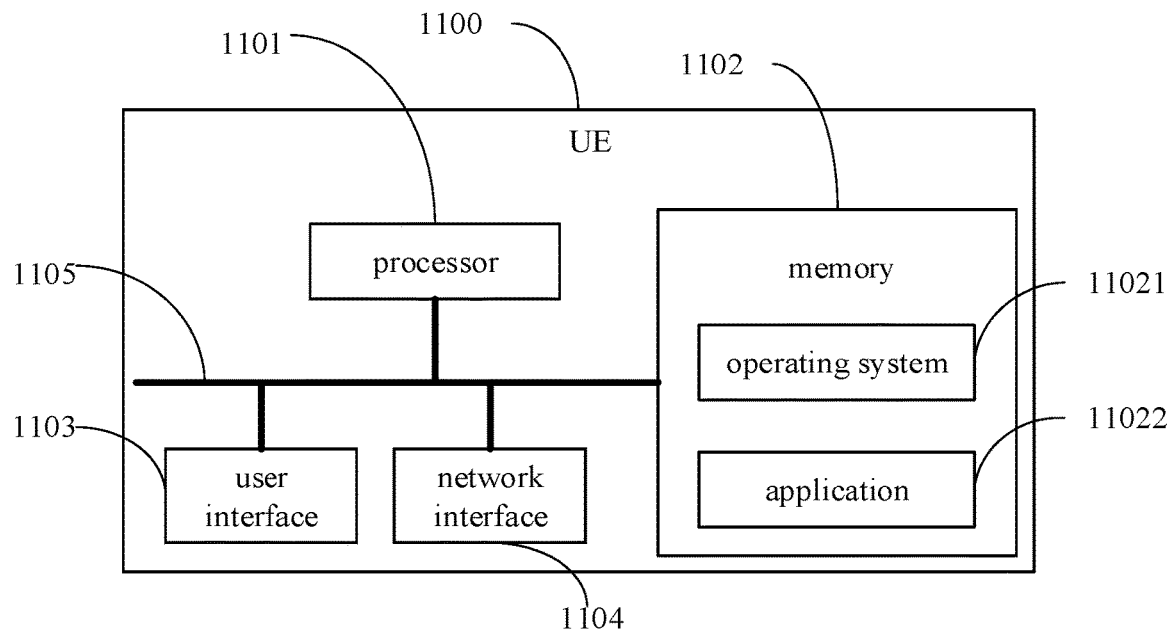
FIG. 11 is a structural diagram of a UE in another embodiment of the present disclosure.

FIG. 11 is a block diagram of a UE in another embodiment of the present disclosure. The UE 1100 shown in FIG. 11 includes at least one processor 1101, a memory 1102, at least one network interface 1104, and a user interface 1103. The various components in UE 1100 are coupled together by bus system 1105. It will be appreciated that bus system 1105 is used to effect connection communication between these components. Bus system 1105 includes, in addition to a data bus, a power bus, a control bus, and a status signal bus. For clarity of illustration, however, various buses are labeled bus system 1105 in FIG. 11.

Therein, the user interface 1103 may include a display, a keyboard, or a pointing device (e.g., a mouse, a trackball, a touch pad, or a touch screen, etc.).

It will be appreciated that memory 1102 in embodiments of the present disclosure may be volatile memory or non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which functions as an external cache. By way of example, and not limitation, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), and Direct Rambus RAM (DRRAM). The memory 1102 of the systems and methods described in embodiments of the present disclosure is intended to include, but is not limited to, these and any other suitable types of memory.

In some embodiments, memory 1102 stores elements, executable modules or data structures, or a subset thereof, or an extended set thereof: an operating system 11021 and an application 11022.

The operating system 11021 includes various system programs, such as a framework layer, a core library layer, a driver layer, and the like, for implementing various basic services and processing hardware-based tasks. The application program 11022 includes various application programs, such as a Media Player, a Browser, and the like, for implementing various application services. A program for implementing the method of the embodiment of the present disclosure may be included in the application program 11022.

In the present disclosed embodiment, the UE 1100 further includes a computer program stored in the memory 1102 and operable on the processor 1101, where the processor 1101 executes the computer program to:

measure a corresponding reference signal according to a downlink measurement configuration of a network device, where the downlink measurement configuration includes at least one of content information of measurement report, measured reference signal resource related information and an association relationship information of reference signal resource and measurement report;

generate at least one measurement report, based on at least one of the content information of measurement report, the measured reference signal resource related information, the association relationship information of reference signal resource and measurement report and measurement results of reference signal; and send the at least one measurement report.

The method disclosed in the above-described embodiments of the present disclosure may be applied to or implemented by the processor 1101. The processor 1101 may be an integrated circuit chip having signal processing capabilities. In an implementation, the steps of the above method may be performed by integrated logic circuits of hardware in the processor 1101 or instructions in the form of software. The processor 1101 described above may be a general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component. The methods, steps, and logical block diagrams disclosed in the embodiments of the present disclosure may be implemented or performed. The general purpose processor may be a microprocessor or the processor may be any conventional processor or the like. The steps of the method disclosed in connection with the embodiments of the present disclosure may be embodied directly as being performed by a hardware decoding processor, or may be performed by a combination of hardware and software modules in the decoding processor. The software modules may be located in random access memory, flash memory, read-only memory, programmable read-only memory, or electrically erasable programmable memory, registers, or other computer-readable storage media mature in the art. The computer-readable storage medium is located in the memory 1102, and the processor 1101 reads the information in the memory 1102 to perform the steps of the above-described method in conjunction with its hardware. Specifically, the computer readable storage medium has stored thereon a computer program which, when executed by the processor 1101, implements the steps of the method embodiment as described above for measurement reporting.

It will be appreciated that the embodiments described in the embodiments of the present disclosure may be implemented in hardware, software, firmware, middleware, microcode, or combinations thereof. For a hardware implementation, the processing units may be implemented in one or more Application Specific Integrated Circuits (ASIC), Digital Signal Processor (DSP), DSP Device (DSPD), Programmable Logic Device (PLD), Field-Programmable Gate Array (FPGA), general purpose processors, controllers, microcontrollers, microprocessors, other electronic units for performing the functions described in the present disclosure, or combinations thereof.

For a software implementation, the techniques described in the embodiments of the present disclosure may be implemented by modules (e.g., processes, functions, etc.) that perform the functions described in the embodiments of the present disclosure. The software code may be stored in a memory and executed by a processor. The memory may be implemented in or external to the processor.

The processor 1101 executes the computer program to:

the content information of measurement report includes at least a content type of measurement report;

the content type includes at least one of:

a beam reporting based on a CSI-RS measurement or/and a SSB measurement; and a CSI reporting based on a CSI-RS measurement.

Optionally, the generating the at least one measurement report based on at least one of the content information of measurement report, the measured reference signal resource related information, the association relationship information of reference signal resource and measurement report and the measurement results of reference signal includes:

in the case that a time domain transmission mode of a RS resource setting or a RS resource set configured in the reference signal resource related information is periodic or semi-persistent, generating, based on the content information of measurement report, a measurement report for the measurement results of reference signal in each RS resource setting or/and RS resource set.

Optionally, the generating, based on the content information of measurement report, the measurement report for the measurement results of reference signal in each RS resource setting or/and RS resource set includes at least one of:

selecting a CRI and a RSRP of at least one optimal beam based on a measurement result of CSI-RS in the RS resource setting or/and the RS resource set, to generate a beam reporting;

selecting a SSBRI and a RSRP of at least one optimal beam based on a measurement result of SSB in the RS resource setting or/and the RS resource set, to generate a beam reporting;

selecting at least one of a CQI, a PMI and a RI based a measurement result of CSI-RS in the RS resource setting or/and the RS resource set, to generate a CSI reporting; or generating a combined measurement result based on a measurement result of CSI-RS and a measurement result of SSB in the RS resource setting or/and the RS resource set, to generate a beam reporting based on the combined measurement result.

Optionally, the measuring the corresponding reference signal according to the downlink measurement configuration of the network device includes:

in the case that time domain transmission modes of a RS resource setting and a RS resource set configured in the reference signal resource related information are both aperiodic and first DCI triggering a measurement of the RS resource setting or/and the RS resource set configured in the reference signal resource related information is received from the network device, measuring the corresponding reference signal in the RS resource setting or/and the RS resource set.

Optionally, subsequent to the measuring the corresponding reference signal in the RS resource setting or/and the RS resource set, the method further includes:

in the case that a corresponding RS type in a first RS resource setting or RS resource set is a CSI-RS and a corresponding RS type in a second RS resource setting or RS resource set is an SSB, determining a combined measurement result generated after performing a corresponding CSI-RS measurement on the first RS resource setting or RS resource set and SSB measurement on the second RS resource setting or RS resource set; or in the case that a corresponding RS type in a third RS resource setting or RS resource set includes a CSI-RS and an SSB, determining a combined measurement result generated after performing a corresponding CSI-RS measurement and SSB measurement on the third RS resource setting or RS resource set.

Optionally, the determining the combined measurement result generated after performing the corresponding CSI-RS measurement and SSB measurement includes:

determining a maximum value or a statistical average value of RSRPs after the CSI-RS measurement and the SSB measurement are performed;

determining a RS resource index corresponding to the maximum value or the statistical average, where the RS resource index includes a CRI and/or an SSBRI; and taking the determined RS resource index and the RSRP corresponding to the determined RS resource index as the combined measurement result.

Optionally, the first, second and/or third RS resource setting or RS resource set for generating the combined measurement result are determined in one of the following manners:

determined based on configuration information received from the network device;

selected and determined by the UE according to a preset manner; or determined according to pre-determined information with the network device.

Optionally, the generating the at least one measurement report based on at least one of the content information of measurement report, the measured reference signal resource related information, the association relationship information of reference signal resource and measurement report and the measurement results of reference signal includes:

in the case that a second DCI triggering at least one report setting is received from the network device, determining an ranking manner of the measurement results according to at least one of the content information of measurement report, the measured reference signal resource related information and the association relationship information of reference signal resource and measurement report;

ranking the measurement results according to the ranking manner; and generating the measurement report according to the ranked measurement results.

Optionally, the ranking manner includes:

a ranking manner of one or more RS resource settings or/and RS resource sets associated with the report setting in the association relationship information of reference signal resource and measurement report.

Optionally, the determining the ranking manner of the measurement results includes:

determining the ranking manner according to ranking information received from the network device; or determining the ranking manner according to ranking information pre-determined with the network device; or determining the ranking manner according to pre-stored ranking information.

Optionally, the second DCI is the same as the first DCI.

Optionally, the ranking manner includes: ranking according to at least one of a report setting index, a RS resource setting index, a content type of measurement report determined by the content information of measurement report, a RS resource set index, a RS type in the RS resource setting and a RS type in the RS resource set.

Optionally, the generating the at least one measurement report based on at least one of the content information of measurement report, the measured reference signal resource related information, the association relationship information of reference signal resource and measurement report and the measurement results of reference signal includes:

in the case that a third DCI triggering at least one report setting is received from the network device, generating, based on the content information of measurement report, a measurement report for the measurement results of reference signal in each RS resource setting or/and RS resource set.

Optionally, the third DCI is the same as the first DCI.

Optionally, prior to the sending the at least one measurement report, the method further includes:

in the case that a size of the at least one measurement report exceeds a carrying capacity of an uplink channel, dropping a part of reporting contents in the measurement report according to a preset rule.

Optionally, prior to the dropping a part of reporting contents in the measurement report according to the preset rule, the method further includes:

determining the preset rule according to rule information received from the network device; or determining the preset rule according to rule information pre-determined with the network device; or determining the preset rule according to pre-stored rule information.

Optionally, the dropping a part of reporting contents in the measurement report according to the preset rule includes:

dropping a part of reporting contents in the measurement report according to priorities or an arrangement order of reporting contents.

According to the embodiment of the present disclosure, the downlink measurement configuration sent by the network device includes at least one of content information of measurement report, measured reference signal resource related information and an association relationship information of reference signal resource and measurement report. After receiving the downlink configuration information, the UE may determine a reference signal to be measured, according to the content information of the measurement report, and measure the reference signal according to the downlink measurement configuration. For the measurement result, the UE may generate at least one measurement report according to at least one of the content information of measurement report, the measured reference signal resource related information and the association relationship information of reference signal resource and measurement report, and then send the measurement report, thereby making clear for the UE the process in generating the measurement report and uploading the measurement report.

Optionally, a UE is further provided in an embodiment of the present disclosure, including a processor 1101, a memory 1102 and a computer program stored in the memory 1102 and executable on the processor 1101. The processor 1101 executes the computer program to perform the measurement reporting method hereinabove, and achieves the same technical effect. To avoid repetition, details are not described herein.

Figure 12:
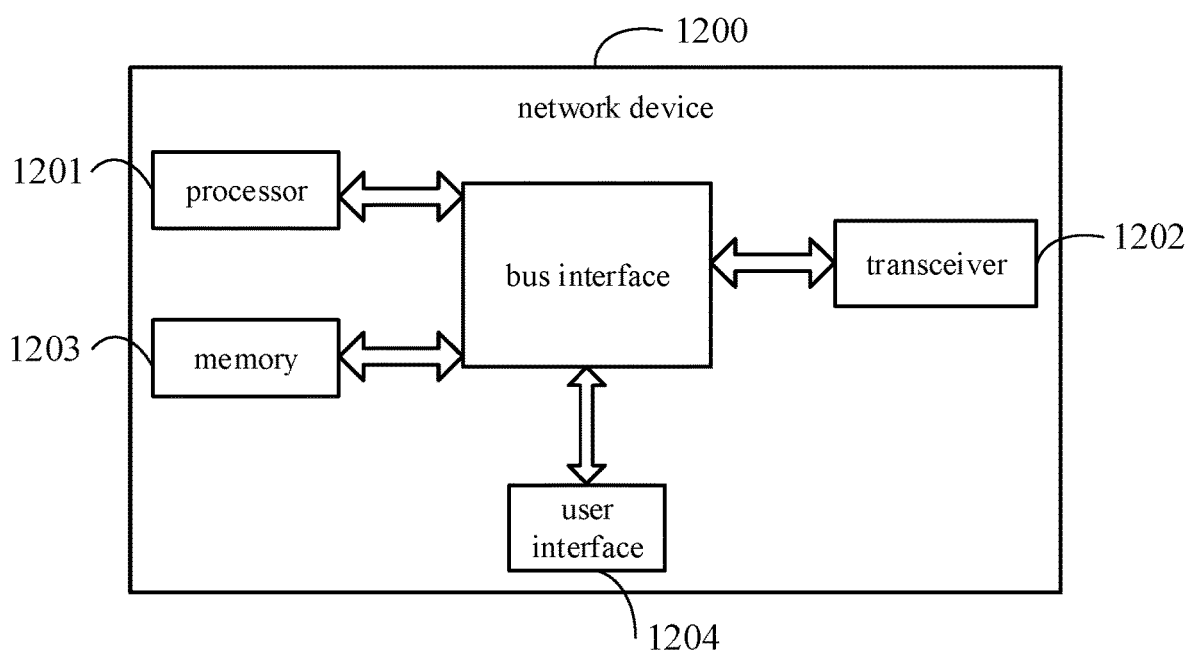
FIG. 12 is a block diagram of a network device in another embodiment of the present disclosure.

Referring to FIG. 12, FIG. 12 is a block diagram of a network device in an embodiment of the present disclosure. As shown in FIG. 12, a network device 1200 includes a processor 1201, a transceiver 1202, a memory 1203, a user interface 1204, and a bus interface.

In the embodiments of the present disclosure, the network device 1200 further includes a computer program stored in memory 1203 and operable on the processor 1201, the processor 1201 executes the computer program to:

send a downlink measurement configuration measuring a corresponding reference signal, where the downlink measurement configuration includes at least content information of measurement report, measured reference signal resource related information and an association relationship information of reference signal resource and measurement report.

In FIG. 12, the bus architecture may include any number of interconnected buses and bridges, specifically one or more processors represented by processor 1201 and various circuits of memory represented by memory 1203 linked together. The bus architecture may also link various other circuits, such as peripherals, voltage regulators, and power management circuits, all of which are well known in the art and therefore will not be described further herein. The bus interface provides an interface. Transceiver 1202 may be a plurality of elements, including a sender and a receiver, providing units for communicating with various other devices on a transmission medium. For different user devices, the user interface 1204 may also be an interface capable of externally and externally connecting a desired device, including, but not limited to, a keypad, a display, a speaker, a microphone, a joystick, and the like.

The processor 1201 is responsible for managing the bus architecture and general processing, and the memory 1203 may store data used by the processor 1201 in performing operations.

According to the embodiment of the present disclosure, the downlink measurement configuration sent by the network device includes at least one of content information of measurement report, measured reference signal resource related information and an association relationship information of reference signal resource and measurement report. After receiving the downlink configuration information, the UE may determine a reference signal to be measured, according to the content information of the measurement report, and measure the reference signal according to the downlink measurement configuration. For the measurement result, the UE may generate at least one measurement report according to at least one of the content information of measurement report, the measured reference signal resource related information and the association relationship information of reference signal resource and measurement report, and then send the measurement report, thereby making clear for the UE the process in generating the measurement report and uploading the measurement report.

Optionally, the processor 1201 executes the computer program to:

send first DCI triggering a UE to measure the corresponding reference signal in a RS resource setting or/and a RS resource set configured in the reference signal resource related information in the case that time domain transmission modes of the RS resource setting and the RS resource set configured in the reference signal resource related information are both aperiodic.

Optionally, the processor 1201 executes the computer program to:

send second DCI triggering at least one report setting, where the second DCI is for enabling the UE to determine an ranking manner of measurement results according to at least one of the content information of measurement report, the measured reference signal resource related information and the association relationship information of reference signal resource and measurement report.

Optionally, the processor 1201 executes the computer program to:

send ranking information enabling the UE to determine the ranking manner.

Optionally, the processor 1201 executes the computer program to:

send third DCI triggering at least one report setting, where the third DCI is for enabling the UE to generate, based on the content information of measurement report, a measurement report for the measurement results of reference signal in each RS resource setting or/and RS resource set.

Optionally, the processor 1201 executes the computer program to:

sending rule information enabling the UE to drop a part of reporting contents in the measurement report in the case that a size of the generated at least one measurement report exceeds a carrying capacity of an uplink channel.

Optionally, a network device is further provided in an embodiment of the present disclosure, including a processor 1201, a memory 1203, and a computer program stored in the memory 1203 and executable on the processor 1201. The processor 1201 executes the computer program to perform the measurement reporting method hereinabove, and achieves the same technical effect. To avoid repetition, details are not described herein.

A computer readable storage medium is further provided in an embodiment of the present disclosure, where a computer program is stored therein. A processor executes the computer program to perform the measurement reporting method hereinabove, and achieves the same technical effect. To avoid repetition, details are not described herein. The computer-readable storage medium includes a Read-Only Memory (ROM), a Random Access Memory (RAM), a magnetic disk, an optical disk, and the like.

It is to be noted that, in this context, the terms "include," "including," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without more limitations, elements defined by the "including a" does not rule out there are additional identical elements in the process, method, article, or apparatus that includes the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The embodiments of the present disclosure have been described above in connection with the drawings, but the present disclosure is not limited to the specific embodiments described above. The specific embodiments described above are merely illustrative and not restrictive, and those ordinary skill in the art will be able to make many forms without departing from the principle of the disclosure and the scope of the claims, all of which fall within the scope of the present disclosure.

What is claimed is:

1. A measurement reporting method, performed by a User Equipment (UE), comprising:

measuring a corresponding reference signal according to a downlink measurement configuration of a network device, wherein the downlink measurement configuration comprises at least one of content information of measurement report or an association relationship information of reference signal resource and measurement report;

generating at least one measurement report, based on at least one of the content information of measurement report or the association relationship information of reference signal resource and measurement report and measurement results of reference signal; and sending the at least one measurement report;

the content information of the measurement report comprises at least a content type of measurement report;

the content type comprises:

a beam report based on a Channel State Information Reference Signal (CSI-RS) measurement or/and a Synchronization Signal Block (SSB) measurement;

wherein the downlink measurement configuration further comprises measured reference signal resource related information;

wherein time domain transmission modes of a RS resource setting and a RS resource set configured in the reference signal resource related information are both aperiodic and first Downlink Control Information (DCI) triggering a measurement of the RS resource setting or/and the RS resource set configured in the reference signal resource related information is received from the network device, and the measuring the corresponding reference signal according to the downlink measurement configuration of the network device comprises:

measuring the corresponding reference signal in the RS resource setting or/and the RS resource set;

wherein a corresponding RS type in a first RS resource setting or RS resource set is a CSI-RS and a corresponding RS type in a second RS resource setting or RS resource set is an SSB, and subsequent to the measuring the corresponding reference signal in the RS resource setting or/and the RS resource set, the method further comprises:

determining a combined measurement result generated after performing a corresponding CSI-RS measurement on the first RS resource setting or RS resource set and SSB measurement on the second RS resource setting or RS resource set;

wherein the SSB and the CSI-RS in the combined calculation are in a spatial quasi-co-location relationship.

2. The method according to claim 1, wherein the content type further comprises:

a Channel State Information (CSI) reporting based on a CSI-RS measurement.

3. The method according to claim 1, wherein
the determining the combined measurement result generated after performing the corresponding CSI-RS measurement and SSB measurement comprises:
  determining a maximum value or a statistical average value of RSRPs after the CSI-RS measurement and the SSB measurement are performed;
  determining a RS resource index corresponding to the maximum value or the statistical average, wherein the RS resource index comprises a CRI and/or an SSBRI; and
  taking the determined RS resource index and the RSRP corresponding to the determined RS resource index as the combined measurement result.

4. The method according to claim 1, wherein the first, second RS resource setting or RS resource set for generating the combined measurement result are determined in one of the following manners:
  determined based on configuration information received from the network device;
  selected and determined by the UE according to a preset manner; or
  determined according to pre-determined information with the network device.

5. The method according to claim 1, wherein
the generating the at least one measurement report further comprises:
  in the case that a second DCI triggering at least one report setting is received from the network device, determining a ranking manner of the measurement results according to at least one of the content information of measurement report, the measured reference signal resource related information or the association relationship information of reference signal resource and measurement report;
  ranking the measurement results according to the ranking manner; and
  generating the measurement report according to the ranked measurement results.

6. The method according to claim 5, wherein
the ranking manner comprises:
  a ranking manner of one or more RS resource settings or/and RS resource sets configured in the reference signal resource related information associated with the report setting in the association relationship information of reference signal resource and measurement report;
  or
  the ranking manner comprises:
  ranking according to at least one of a report setting index, a RS resource setting index, a content type of measurement report determined by the content information of measurement report, a RS resource set index, a RS type in the RS resource setting and a RS type in the RS resource set.

7. The method according to claim 5, wherein the determining the ranking manner of the measurement results comprises:
  determining the ranking manner according to ranking information received from the network device; or
  determining the ranking manner according to ranking information pre-determined with the network device; or
  determining the ranking manner according to pre-stored ranking information;
  or,
  the second DCI is the same as the first DCI.

8. The method according to claim 1, wherein
the generating the at least one measurement report further comprises:
  in the case that a second DCI triggering at least one report setting is received from the network device, generating, based on the content information of measurement report, a measurement report for the measurement results of reference signal in each RS resource setting or/and RS resource set;
  wherein the second DCI is the same as the first DCI.

9. The method according to claim 1, wherein prior to the sending the at least one measurement report, the method further comprises:
  in the case that a size of the at least one measurement report exceeds a carrying capacity of an uplink channel, dropping a part of the reporting contents in the measurement report according to a preset rule;
  wherein prior to the dropping a part of the reporting contents in the measurement report according to the preset rule, the method further comprises:
  determining the preset rule according to rule information received from the network device; or
  determining the preset rule according to rule information pre-determined with the network device; or
  determining the preset rule according to pre-stored rule information;
  or,
  the dropping a part of the reporting contents in the measurement report according to the preset rule comprises:
  dropping a part of the reporting contents in the measurement report according to priorities or an arrangement order of the reporting contents.

10. A measurement reporting method, performed by a network device, comprising:
  sending a downlink measurement configuration for measuring a corresponding reference signal, wherein the downlink measurement configuration comprises at least content information of a measurement report or an association relationship information of reference signal resource and the measurement report;
  the content information of the measurement report comprises at least a content type of measurement report;
  the content type comprises:
  a beam report based on a Channel State Information Reference Signal (CSI-RS) measurement or/and a Synchronization Signal Block (SSB) measurement;
  wherein the downlink measurement configuration further comprises measured reference signal resource related information;
  the method further comprises:
  sending first Downlink Control Information (DCI) triggering a User Equipment (UE) to measure the corresponding reference signal in a reference signal (RS) resource setting or/and a RS resource set configured in the reference signal resource related information, and to, determine a combined measurement result generated after performing a corresponding CSI-RS measurement on a first RS resource setting or RS resource set and SSB measurement on a second RS resource setting or RS resource set, wherein time domain transmission modes of the RS resource setting and the RS resource set configured in the reference signal resource related information are both aperiodic, and a corresponding RS type in the first RS resource setting or RS resource set is a CSI-RS and a corresponding RS type in the second RS resource setting or RS resource set is an SSB;

wherein a SSB and a CSI-RS in the combined calculation are in a spatial quasi-co-location relationship.

11. The method according to claim 10, further comprising:

sending second DCI triggering at least one report setting, wherein the second DCI is for enabling the UE to determine a ranking manner of measurement results according to at least one of the content information of measurement report, the measured reference signal resource related information and the association relationship information of reference signal resource and measurement report; and sending ranking information enabling the UE to determine the ranking manner;

or, the method further comprises:

sending third DCI triggering at least one report setting, wherein the third DCI is for enabling the UE to generate, based on the content information of measurement report, a measurement report for the measurement results of reference signal in each RS resource setting or/and RS resource set.

12. The method according to claim 10, further comprising:

sending rule information enabling the UE to drop a part of the reporting contents in the measurement report in the case that a size of the generated at least one measurement report exceeds a carrying capacity of an uplink channel.

13. A network device, comprising a memory, a processor and a computer program stored in the memory and executable on the processor, wherein the processor executes the computer program to perform the measurement reporting method according to claim 10.

14. A User Equipment (UE), comprising a memory, a processor and a computer program stored in the memory and executable on the processor, wherein the processor executes the computer program to:

measure a corresponding reference signal according to a downlink measurement configuration of a network device, wherein the downlink measurement configuration comprises at least one of content information of measurement report or an association relationship information of reference signal resource and measurement report;

generate at least one measurement report, based on at least one of the content information of measurement report or the association relationship information of reference signal resource and measurement report and measurement results of reference signal; and send the at least one measurement report;

the content information of the measurement report comprises at least a content type of measurement report;

the content type comprises:

a beam report based on a Channel State Information Reference Signal (CSI-RS) measurement or/and a Synchronization Signal Block (SSB) measurement;

wherein the downlink measurement configuration further comprises measured reference signal resource related information;

the processor further executes the computer program to:

in the case that time domain transmission modes of a RS resource setting and a RS resource set configured in the reference signal resource related information are both aperiodic and first Downlink Control Information (DCI) triggering a measurement of the RS resource setting or/and the RS resource set configured in the reference signal resource related information is received from the network device, measure the corresponding reference signal in the RS resource setting or/and the RS resource set;

wherein subsequent to the measuring the corresponding reference signal in the RS resource setting or/and the RS resource set, the processor further executes the computer program to:

in the case that a corresponding RS type in a first RS resource setting or RS resource set is a CSI-RS and a corresponding RS type in a second RS resource setting or RS resource set is an SSB, determine a combined measurement result generated after performing a corresponding CSI-RS measurement on the first RS resource setting or RS resource set and SSB measurement on the second RS resource setting or RS resource set;

wherein the SSB and the CSI-RS in the combined calculation are in a spatial quasi-co-location relationship.

15. The UE according to claim 14, wherein the content type further comprises:

a Channel State Information (CSI) reporting based on a CSI-RS measurement.

16. The UE according to claim 15, wherein the processor executes the computer program to:

in the case that a time domain transmission mode of a reference signal (RS) resource setting or a RS resource set configured in the reference signal resource related information is periodic or semi-persistent, generate, based on the content information of measurement report, a measurement report for the measurement results of reference signal in each RS resource setting or/and RS resource set.

17. The UE according to claim 16, wherein the processor executes the computer program to perform at least one of:

selecting at least one of a Channel Quality Indication (CQI), a Precoding Matrix Indicator (PMI) and a Rank Indication (RI) based a measurement result of CSI-RS in the RS resource setting or/and the RS resource set, to generate a CSI reporting; or generating a combined measurement result based on a measurement result of CSI-RS and a measurement result of SSB in the RS resource setting or/and the RS resource set, to generate a beam report based on the combined measurement result.

18. The UE according to claim 14, wherein the processor executes the computer program to:

determine a maximum value or a statistical average value of RSRPs after the CSI-RS measurement and the SSB measurement are performed;

determine a RS resource index corresponding to the maximum value or the statistical average, wherein the RS resource index comprises a CRI and/or an SSBRI; and take the determined RS resource index and the RSRP corresponding to the determined RS resource index as the combined measurement result.

* * * * *